United States Patent [19]

Lamb et al.

[11] Patent Number: 5,698,140
[45] Date of Patent: Dec. 16, 1997

[54] AEROGEL/FULLERENE HYBRID MATERIALS FOR ENERGY STORAGE APPLICATIONS

[75] Inventors: Lowell D. Lamb; Donald R. Huffman, both of Tucson, Ariz.

[73] Assignee: The Arizona Board of Regents, on behalf of the University of Arizona, Tucson, Ariz.

[21] Appl. No.: 640,540

[22] Filed: May 2, 1996

[51] Int. Cl.$^6$ .............................. H01B 1/04; C01B 31/00
[52] U.S. Cl. ....................... 252/502; 252/500; 252/510; 423/445 B; 423/DIG. 40; 427/113; 428/305.5; 428/317.9; 428/318.4
[58] Field of Search ....................... 252/500, 502, 252/510, 315.1; 423/445 B, DIG. 40; 427/113; 428/305.5, 317.9, 318.4

[56] References Cited

U.S. PATENT DOCUMENTS 5,470,680 11/1995 Loutfy et al. ..................... 429/218

OTHER PUBLICATIONS

Lamb, L.D. "Fullerene Production," The Chemistry of Fullerenes, R. Taylor, pp. 20–34 1995.
Taylor, R. and Walton, D., "The Chemistry of Fullerenes," vol. 363, pp. 685–693 Jun. 1993.
Shen et al "Quantum confinement effect of fullerenes in silica aerogel" Peop. Rep. China Phys. Lett., 12(11), 1995 pp. 693–696. (Abstract Only) (No Month).
Wang "Reticulated Vitreous Carbon–A New Versatile Electrode Material" Electrochem. Acta, vol. 26, No. 12, 1981 (No Month) pp. 1721–1726.

Primary Examiner—Douglas J. McGinty
Assistant Examiner—Mark Kopec
Attorney, Agent, or Firm—Antonio R. Durando

[57] ABSTRACT

A hybrid material comprising an extremely porous, carbon-bearing substrate, such as a carbon-bearing aerogel, and fullerene molecules loaded in the pores of the substrate. The hybrid compound is obtained by several approaches, including chemical vapor infiltration of fullerenes into finished carbon-containing aerogels; infiltration of fullerenes during the solvent displacement step of aerogel preparation; and addition of fullerenes to solgel starting materials.

12 Claims, 1 Drawing Sheet

AEROGEL/FULLERENE HYBRID MATERIALS FOR ENERGY STORAGE APPLICATIONS

BACKGROUND OF THE INVENTION

1. Field of the Invention

This invention pertains in general to hybrid materials created for the purpose of improving the properties of at least one of the constituents. In particular, it relates to the combination of fullerenes and extremely porous materials, such as aerogels, to produce an improved hybrid for energy storage applications.

2. Description of the Prior Art

Carbon is available in various crystallographic structures, ranging from highly oriented pyrolytic graphite to amorphous carbon black and active carbon. Between these extremes, there exists a multitude of carbons with differing physicochemical properties and morphologies. For example, so-called glassy carbons have diffuse x-ray diffraction patterns characteristic of amorphous materials, but have a structure that consists of microfibrils that twist, bend and interlock to form strong inter-fibrillar bonds. Another, the recently discovered class of all-carbon molecules, the fullerenes, has attracted considerable attention because of their unique structures and interesting physicochemical properties.

The Huffman-Krätschmer fullerene-production technique described in abandoned U.S. applications Ser. No. 07/575,254 and Ser. No. 07/580,246, filed on Aug. 30, 1990, and Sep. 10, 1990, respectively, touched off a world-wide explosion of research into the properties and potential applications of these fascinating molecules and their condensed phases. Their complex chemistry is reminiscent of that of alkenes (see Taylor, R. and D. R. M. Walton, Nature 303, 685–693, 1993), and this knowledge has led to the synthesis of numerous new compounds and fullerene-based materials, with suggested applications ranging from medicine to photoconducting polymers to rocket fuels. Among these many novel and potentially useful properties, investigators soon recognized that fullerenes have great theoretical potential for energy storage. As the cages consist entirely of $sp^2$-hybridized carbons, which have electron-withdrawing –I inductive effects, the fullerenes are strongly electron-attracting. In fact, up to six electrons can be added, reversibly, to each $C_{60}$ molecule (see R. Taylor and Walton, D., "The Chemistry of Fullerenes," Nature, Vol. 363, pages 685–693. Certain $C_{60}$ derivatives can be reversibly charged to –6 in solution, and many hydrogens can be reversibly added to a single $C_{60}$.

Among the various fullerene molecules, which are all formed entirely of carbon in the sp-hybridized state, $C_{60}$ and $C_{70}$ are the most accessible members of the family of closed-cage fullerene molecules. $C_{60}$ and $C_{70}$ have received an enormous amount of attention, but they are only the first two members of an extensive family of entirely new carbon structures (constituting the third known form of carbon, after diamond and graphite). Hundreds of species of larger fullerenes can also be made in bulk, as well as endohedral fullerenes, carbon nanotubes, and carbon nanoparticles (Lamb, L. D., "Fullerene Production," The Chemistry of Fullerenes, R. Taylor, Ed., 20–34, World Scientific, London, 1995). Although these materials can be made with relative ease and in reasonable quantities, except for $C_{60}$, $C_{70}$, $C_{76}$, and all isomers of $C_{78}$ and $C_{84}$, they have been difficult to isolate; therefore, little is known about them. Based on their structural similarities, though, it is expected that all fullerenes provide the advantages disclosed herein with reference to $C_{60}$ and $C_{70}$.

The practical challenge in constructing fullerene-based energy storage devices has been that of getting the charge on and off the ball. Although potentially useful reactions work well in solution, charges are not readily transported within pure-fullerene solids, which are insulators. Therefore, in practice it has not been possible to exploit the potential of fullerenes as energy storage devices. Thus, we have investigated the idea of using electrically-conductive media, such as porous carbon and carbon-bearing porous material, as a fullerene-bearing substrate to produce a hybrid material capable of fully employing the electrical properties of fullerenes.

Porous carbon materials have had important commercial uses ranging from catalysis to filtration to energy storage, and their continuing development is an extremely active field in materials science. Among porous carbons, it is known that carbon aerogels hold exceptional promise for energy-storage applications. These extremely fine-scale, ultra-low density, open-pore structures can be made with point-to-point resistances as low as one Ohm, surface areas ranging from 150 to 800 $m^2$/gm, and can readily serve as a "host" matrix for a wide variety of nanophase materials. They are stable at high temperatures, and can be formulated to tolerate aqueous electrolytes. Because of their method of preparation (sol-gel processing followed by supercritical-solvent extraction), they are low cost and can be cast in a wide variety of shapes.

Because carbon aerogels are electrically conductive, we hypothesized that they would provide an excellent substrate for receiving dielectric materials having high energy storage capacity, such as fullerenes. Thus, the thrust of this invention is the combination of fullerenes and porous materials to produce greatly improved hybrid materials for energy storage.

SUMMARY OF THE INVENTION

One of the objectives of this invention is a material characterized by very high energy-storage capacity, thereby providing a material suitable for improving electrical battery apparatus, electrochemical double-layer capacitors, "ultracapacitors," and hydrogen storage.

Another objective of the invention is an energy-storage material that is light in comparison to conventional battery elements.

In particular, an objective of the invention is a hybrid material that combines the electrical properties of fullerenes with the extremely fine-scale, ultra-low density, open-pore structure, and low electrical resistance of aerogels or similar porous substrates.

From the combination of these materials, one goal of the invention is to provide thin layers of fullerene molecules distributed over a very large surface area packed in a very small volume, thereby creating a material with very high specific capacity.

Another goal of the combination is to obtain an electrically-conductive matrix in physical contact with the deposited layers of dielectric fullerene molecules, thereby rendering the resulting hybrid effectively conductive.

Finally, an objective of this invention is the realization of the above mentioned goals in an economical and commercially viable manner.

According to the foregoing objectives, this invention consists of a hybrid material comprising an extremely porous, carbon-bearing substrate, such as a carbon-bearing aerogel, and fullerene molecules loaded in the pores of the substrate. The hybrid compound can be obtained by several approaches, including chemical vapor infiltration of fullerenes into finished carbon-containing aerogels; infiltration of fullerenes during the solvent-displacement step of aerogel preparation; and addition of fullerenes to solgel starting materials.

Various other purposes and advantages of this invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DETAILED DESCRIPTION OF THE INVENTION

Figure 1:
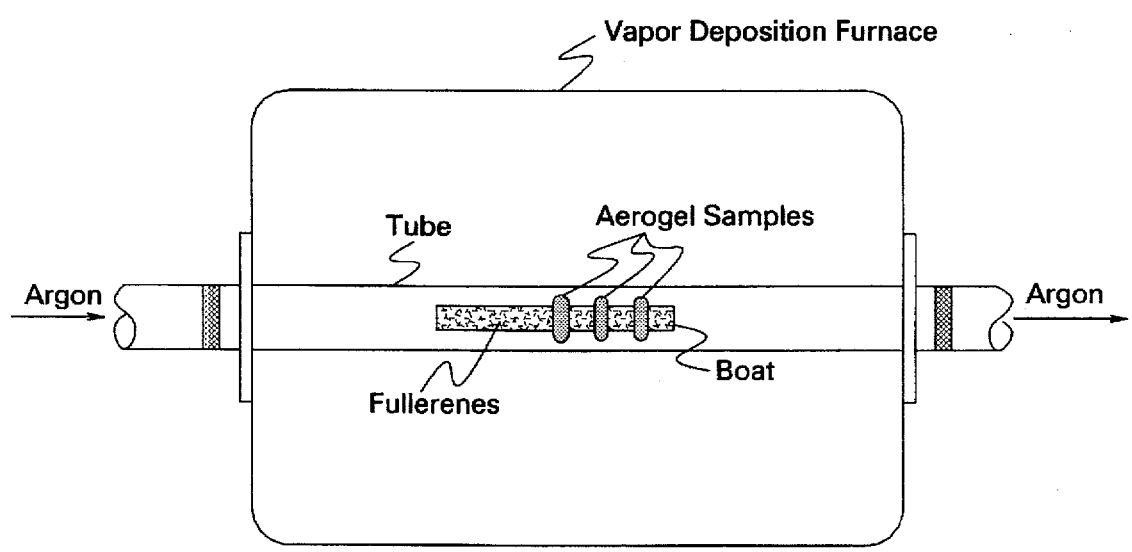
FIG. 1 is a schematic plan view of a vapor deposition chamber showing three aerogel samples placed on top of a boat filled with fullerene material for charging the aerogel with fullerenes according to the invention.

The heart of this invention lies in the idea of utilizing the structural properties of highly porous materials, such as aerogels, to provide a suitable substrate for maximizing the exploitation of the electrochemical properties of fullerenes. One aspect of this idea relates to the extremely high surface/volume ratio of these materials, which enables the deposition of fullerene molecules over the extremely-large surfaces of pores packed in very small volumes, thereby producing a very efficient energy-storage device. Because of the dielectric characteristics of fullerenes, which limit the exploitation of their electrical properties to surface phenomena, the structural configuration of this invention provides a key for maximizing the efficiency of fullerenes as a vehicle for storing electrical energy. In addition, porous substrates have the attendant advantage of being inherently low-density materials, thereby producing light-weight hybrids that are very desirable for energy-storage applications.

Another aspect of the invention relates to the use of carbon-bearing aerogels and similar materials that are good electrical conductors. By coating them with fullerenes, these materials not only provide a greatly-expanded surface area for fullerene molecules to interact electrically with the surrounding environment, but also provide a conductive matrix through the structure of the aerogel, which further increases the conductivity of the combination. Therefore, each layer of fullerene molecules deposited over the pore surface of the aerogel is able to interact electrically through paths both in the aerogel structure and in the pore cavities.

Aerogels are known low-density, transparent solids with a fine open-pore structure. Their unique properties derive from the method of preparation which produces extremely fine-scale pores, very high surface areas (>100 $m^2/gm$), low density, and unusual microstructure. Aerogels are typically made by the hydrolysis of a metal oxide or catalytic polymerization of a monomer capable of a high degree of crosslinking. The resulting gel is a low-density solid network permeated by a solvent. The solvent is removed, usually by the replacement of a second solvent under pressure, followed by heating and pressurization to above the critical point of the remaining solvent. When supercritical conditions have been achieved, the pressure is slowly released, allowing the fluid to expand without interfacial surface tension forces that would otherwise collapse the gel. Remaining is a dry, low-density material that may have compositions of many metal oxides (silica being the most prevalent) or an organic polymer. These materials are generally non-conducting without further treatment.

There are two main routes to produce conducting aerogels. The polymeric aerogel can be pyrolyzed to carbon in an inert atmosphere at temperatures of about 1000° C. (Mayer, S. T., R. W. Pekala and J. L. Kashmitter, Journal of the Electrochemical Society 140, 446–451, 1993). Alternatively, as disclosed by W. Cao and A. J. Hunt in pending U.S. patent application Ser. No. 08/221,643, oxide aerogels can be made conducting by a process in which the catalytic behavior of the aerogel is used to decompose hydrocarbon gases within the aerogel to form carbon by chemical vapor infiltration (CVI). This process has the advantage of being able to produce a controlled amount of carbon, ranging from less that 1% to more than 800% of the original aerogel mass. Electrical resistance measurements of the resulting aerogel have yielded point to point resistances as low as one ohm. The resulting surface area, determined from nitrogen adsorption, has been found to vary from 150 to 800 $m^2/gm$, depending on the amount of carbon added.

The CVI process demonstrates that the open-pore character of aerogels allows gases and vapors to pass through their entire volume. This is an important characteristic of aerogels to enable the deployment of other materials on their internal surface. In particular, using this process, we found that the vapor forms of various fullerenes can be deposited on the internal surfaces of high-surface-area aerogels.

In order to test the concept of the invention, novel fullerene/aerogel hybrids were prepared and characterized. Specific targets include the preparation of larger fullerenes ($C_{76}$, $C_{84}$, etc.), mixtures of "giant" fullerenes with narrow size distributions (e.g., $C_{110}$–$C_{130}$, peaked at $C_{120}$), and wellcharacterized soot samples rich in single-walled nanotubes. The intent of these preliminary investigations was to test the practical feasibility of depositing fullerene layers within the aerogel and measure the electrochemistry of the fullerenes via tests of substrate-borne thin films.

EXAMPLE

An aerogel/fullerene hybrid material was prepared by the following procedure:

1. Weighing approximately 1 gram of mixed fullerenes.
2. Placing the fullerenes in a clean quartz boat of a vapor deposition furnace.
3. Placing the boat into a quartz tube and purging the tube with an Argon stream of about 250 ml/min for approximately 7 min.
4. Placing the tube and boat in the furnace set at approximately 300° C. while continuing purging with Argon at a reduced rate of about 50 ml/min.
5. Heating the tube and boat to about 300° C. for about 1.5 hours to drive off impurities.
6. Taking the tube and boat out of the furnace, letting them cool to room temperature, removing the boat and reducing the level of fullerenes, if necessary, so that they would not touch samples placed on top of the boat.
7. Weighing precisely three aerogel samples (one silica-gel and two carbon-gel samples) and placing them on top of the boat over the fullerenes and in the tube, as illustrated in FIG. 1.

8. Purging the tube with Argon at 250 ml/min for about 5 min and placing the tube and boat in the furnace set at 600° C., and then reducing the flow rate of Argon to 20 ml/min.
9. After approximately 1.5 hours, setting the temperature of the furnace at about 650° C.
10. After approximately ½ hour, setting the temperature of the furnace at about 700° C.
11. After approximately ½ hour, setting the temperature of the furnace at about 750° C.
12. After approximately ½ hour, setting the temperature of the furnace at about 800° C.
13. After approximately 50 minutes, taking the tube out of the furnace.
14. Weighing the aerogel samples to determined whether and what amount of fullerenes were deposited within the aerogel.

During steps 9–13, it was observed that the fullerenes would plate out as a yellow/orange/brown solid toward the end of tube where the Argon exited. No crystals were observed forming in the heating zones. Approximately 400 mg of fullerenes sublimed, while approximately 600 mg of fullerenes were left in the boat.

The mass of the three aerogel samples increased as a result of fullerene deposition (about 7.5% for the silica-gel sample; and 20 and 24% for the two carbon-gel samples). UV-visible spectrum analysis of the deposited material proved it to be fullerenes, thereby showing that its character was preserved during deposition. An analysis of the two carbon-gel samples showed that the vapor deposition resulted in monolayer coverage of 20 and 30%, respectively, of the surface of the aerogels.

We anticipate that the combination of fullerenes with carbon-bearing aerogel materials provides a synergistic solution to a number of problems. The fullerenes provide an easily controllable way to increase the active surface area of carbon aerogels, and the aerogel provides an excellent mechanical support and electrical path for the fullerenes. As expected, decorating an aerogel, which is smooth on a nanometer scale, with fullerenes, which are nanometer-scale objects, increased its surface area, hence improving those characteristics that are influenced by surface area (such as electrochemical properties). Moreover, the properties of fullerenes make them excellent materials for incorporation into aerogels. They sublime at low temperatures ($\approx 500°$ C. for $C_{60}$), are stable at high-temperatures, and are soluble in a variety of organic solvents.

Based on known technologies, it is expected that the doping (or coating) of porous structures may be achieved commercially by any of a number of existing techniques. As demonstrated by the example reported in this disclosure, chemical vapor infiltration has produced a hybrid compound wherein the fullerene material has retained its characteristics. Similarly, it is anticipated that fullerenes may be infiltrated into the aerogel structure during the solvent-displacement step of aerogel preparation. Another useful process consists of the addition of fullerenes to the solgel starting material used to produce aerogels. Based on the teachings of L. Zhu et al. (see "Structural and Optical Characteristics of Fullerenes Incorporated inside Porous Silica Aerogel," Chemical Physical Letters 239, 393–398, 1995), this process is believed to be particularly useful to implant buckytubes in the porous structure of the aerogel, resulting in a composite structure with greater strength and electrical connectivity.

The density of the porous substrate is not a critical factor for the invention. The density of aerogels is generally about 0.01–1.5 g/cm$^3$, preferably about 0.01–0.50 g/cm. In addition to aerogels, xerogels are particularly preferred materials for the porous substrate of the invention. As outlined above, the production of xerogels and aerogels is well known in the art, and they can be provided in a variety of shapes, e.g., cylinders, plates, sheets, or fibers. Aerogels and xerogels can, for example, be produced from essentially any composition capable of forming a gel. Typically, xerogels and aerogels are produced by the hydrolysis or polymerization of components containing inorganic metal ions and oxygen ions such as metal oxides, alkoxides, and alcoholates. Metal sulfides may also be suitable. Polymerization results in the formation of a gel containing the polymerized material dispersed in a liquid phase. The liquid dispersion medium is removed by slow drying or supercritical drying, producing little or no shrinkage of the underlying structure of the polymerized material.

Generally, xerogels are considered those structures resulting from air evaporation (i.e., under normal conditions) of the liquid dispersion medium. Aerogels, which typically exhibit a higher porosity, are produced when drying is performed under supercritical conditions. For example, the porosity of xerogels may be as great as about 80 vol. %, typically as high as about 60 vol. %. Aerogels, on the other had, can possess a porosity greater than about 90 vol. %. A detailed discussion regarding the production of both xerogels and aerogels is found in "Aerogels; Proceedings of the First International Symposium," Wurzburg, Federal Republic of Germany, Sep. 23–25, 1985, J. Fricke, ed., Springer-Verlag, Berlin-Heidelberg (1986).

Typical materials used in the formation of aerogels and xerogels are, for example, oxides of elements such as Si, Al, B, Ti, Zr, V, Y, Mg, Mo, Fe, etc. Examples of suitable starting materials include $SiO_2$, $Sl(OCH_3)_4$, $Si(OC_2H_5)$, AlOOH, $Al(OC_4H_9)_3$, $B(OC_4H_9)_3$, $Ti(OC_3H_7)_4$, $Zr(OC_3H_7)_4$, $TiO_2$, $ZrO_2$, etc. and mixtures thereof such as $SiO_2$—$Al_2O_3$, $SiO_2$—$ZrO_2$, $SiO_2$—$B_2O_2$, and $Al_2O_3$—$ZrO_2$. Preferably, the porous substrate is a silica aerogel; more preferably, it is a carbon bearing silica aerogel. In addition to high porosity, aerogel substrates have a further beneficial feature. They are resilient and compliant and thus tend to dampen vibrations, reducing the likelihood of breakage.

Note that other, similar substrates consisting of any porous conductive material (preferably a carbon-bearing material, such as RETICULATED VITREOUS CARBON, which is an open-pore honeycomb structure of vitreous carbon) are suitable for producing fullerenes hybrids. In essence, the idea of the invention is to deposit fullerene molecules in the interstices of a conductive porous medium, thereby loading it, doping it or otherwise charging it with fullerenes. The terms deposit, load, dope and charge, as used herein are intended in a broad sense to mean any form of association or contact, direct or indirect, which results in a composite composition, the components of which are capable of performing their intended functions. These terms therefore are intended to include, for example, any type of incorporation, such as encapsulation, embedding, entrapment, or the like, as well as any form of bonding such as physisorption, absorption, adsorption, chemisorption, covalent bonding, etc.

It is expected that the nanocomposite materials developed according to this invention may find use in battery or capacitor electrodes, magnetic cooling cycles, electroluminescent displays, gas phase catalysts, acousto-optic devices, and for thin-film electronic applications.

While the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What we claim is:

1. A hybrid composition comprising:

a porous substrate of electrically-conductive material selected from the group constisting of aerogels, xegogels, vitreous carbon having an open-pore honeycomb structure, and mixtures thereof, wherein said porous substrate is charged with solid fullerene molecules.

2. The composition of claim 1, wherein said fullerene molecules are selected from the group consisting of $C_{60}$, $C_{70}$, $C_{76}$, $C_{78}$, $C_{84}$, and mixtures thereof.

3. The composition of claim 1, wherein said fullerene molecules consists of $C_{60}$.

4. The composition of claim 1, wherein said fullerene molecules are combined with said porous substrate by chemical vapor infiltration.

5. The composition of claim 2, wherein said fullerene molecules are combined with said carbon-bearing material by chemical vapor infiltration.

6. The composition of claim 3, wherein said fullerene molecules are combined with said porous substrate by chemical vapor infiltration.

7. The composition of claim 1, wherein said porous substrate is selected from the group consisting of aerogels, xerogels, and mixtures thereof and wherein said fullerene molecules are combined with said porous substrate by infiltration during a solvent-displacement step of aerogel preparation.

8. The composition of claim 2, wherein said porous substrate is selected from the group consisting of aerogels, xerogels, and mixtures thereof and wherein said fullerene molecules are combined with said porous substrate by infiltration during a solvent-displacement step of aerogel preparation.

9. The composition of claim 3, wherein said porous substrate is selected from the group consisting of aerogels, xerogels, and mixtures thereof and wherein said fullerene molecules are combined with said porous substrate by infiltration during a solvent-displacement step of aerogel preparation.

10. The composition of claim 1, wherein said porous substrate is selected from the group consisting of aerogels, xerogels, and mixtures thereof and wherein said fullerene molecules are combined with said porous substrate by addition to a solgel starting material during a step of aerogel preparation.

11. The composition of claim 2, wherein said porous substrate is selected from the group consisting of aerogels, xerogels, and mixtures thereof and wherein said fullerene molecules are combined with said porous substrate by addition to a solgel starting material during a step of aerogel preparation.

12. The composition of claim 3, wherein said porous substrate is selected from the group consisting of aerogels, xerogels, and mixtures thereof and wherein said fullerene molecules are combined with said porous substrate by addition to a solgel starting material during a step of aerogel preparation.

* * * * *